United States Patent
Matsuo et al.

(10) Patent No.: US 8,360,715 B2
(45) Date of Patent: Jan. 29, 2013

(54) WIND TURBINE GENERATOR

(75) Inventors: Takeshi Matsuo, Nagasaki (JP); Shinji Arinaga, Nagasaki (JP); Shinsuke Sato, Nagasaki (JP); Takatoshi Matsushita, Nagasaki (JP); Masaaki Shibata, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 525 days.

(21) Appl. No.: 12/593,499

(22) PCT Filed: Jul. 9, 2009

(86) PCT No.: PCT/JP2009/062513
§ 371 (c)(1),
(2), (4) Date: Mar. 5, 2010

(87) PCT Pub. No.: WO2011/004482
PCT Pub. Date: Jan. 13, 2011

(65) Prior Publication Data
US 2010/0164228 A1    Jul. 1, 2010

(51) Int. Cl.
*F03D 11/00* (2006.01)
(52) U.S. Cl. .......................... 415/176; 290/55
(58) Field of Classification Search .................. 415/176, 415/178
See application file for complete search history.

(56) References Cited

U.S. PATENT DOCUMENTS

| | | | |
|---|---|---|---|
| 7,057,305 B2* | 6/2006 | Kruger-Gotzmann et al. | 290/55 |
| 7,427,814 B2* | 9/2008 | Bagepalli et al. | 290/55 |
| 7,658,594 B2* | 2/2010 | Christensen et al. | 416/157 A |
| 7,963,743 B1* | 6/2011 | Winter | 415/178 |
| 8,047,774 B2* | 11/2011 | Bagepalli | 415/176 |
| 8,052,383 B2* | 11/2011 | Frokjaer | 415/178 |
| 8,053,918 B2 | 11/2011 | Wobben | |
| 8,109,814 B2* | 2/2012 | Uchino et al. | 454/184 |
| 2010/0066088 A1 | 3/2010 | Matsushita | |
| 2010/0109326 A1* | 5/2010 | Sato et al. | 290/44 |

(Continued)

FOREIGN PATENT DOCUMENTS

| EP | 2148089 A1 * | 1/2010 |
|---|---|---|
| JP | 58-065977 | 4/1983 |

(Continued)

OTHER PUBLICATIONS

International Search Report for PCT/JP2009/062513, dated Oct. 13, 2009.

(Continued)

*Primary Examiner* — Joseph Waks
(74) *Attorney, Agent, or Firm* — Kanesaka, Berner & Partners, LLP

(57) ABSTRACT

A wind turbine generator capable of enhancing starting performance of the wind turbine generator when the outside air temperature is low and capable of securing temperature adjusting ability of a generator set in a wide outside air temperature range is provided. A wind turbine generator includes a nacelle (3) for accommodating a generator set (11, 12, 14) that generates electricity by rotation of a rotor having a plurality of blades, a ventilation opening (51) provided in a wall surface on a wind upstream side when the nacelle is normally operated, and a heat exchanging unit (13) disposed in the ventilation opening (51) to exchange heat between an outside air and a lubricant of the generator set (11, 12) such as an lubricant oil or cooling water.

6 Claims, 4 Drawing Sheets

U.S. PATENT DOCUMENTS

2010/0148514 A1* 6/2010 Sato et al. .................. 290/55
2011/0012362 A1 1/2011 Kawai et al.

FOREIGN PATENT DOCUMENTS

| JP | 2003269553 A | 9/2003 |
| JP | 2008286115 A | 11/2008 |
| JP | 2008309122 A | 12/2008 |
| WO | 2006032515 A | 3/2006 |
| WO | 2009066491 A1 | 5/2009 |

OTHER PUBLICATIONS

JP Decision to Grant a Patent for JP2008-024501, dated Apr. 3, 2012.

* cited by examiner

WIND TURBINE GENERATOR

CROSS-REFERENCE TO RELATED APPLICATIONS

The present Application is based on International Application No. PCT/JP2009/062513, filed on Jul. 9, 2009, and priority is hereby claimed under 35 USC §119 based on this application. This application is hereby incorporated by reference in its entirety into the present application.

TECHNICAL FIELD

The present invention relates to a wind turbine generator.

BACKGROUND ART

Although an outside air temperature range to which a conventional wind turbine generator is applied is generally $-10°$ to $+40°$, in recent years an installation region of the wind turbine generator is spread to upland and a cold region. In such a case, the outside air temperature is spread to a range of $-30°$ to $+40°$. Therefore, it becomes more important to control the temperature of devices in a nacelle such as a gear box, a main bearing, a generator, a transformer, and an inverter.

As a temperature control system, an oil piping system provided in a blade pitch system, the gear box, the main bearing, or the like has a heater, while a cooling water piping system such as an inverter has a cooler, respectively, and their temperatures are controlled within predetermined temperature ranges (see Patent Citation 1 for example).

A hull of the nacelle is formed with an air supply and exhaust opening from which outside air flowing through a cooler is introduced.

CITATION LIST

Patent Literature

{PTL 1}
Japanese Unexamined Patent Application, Publication No. Sho 58-65977

SUMMARY OF INVENTION

Technical Problem

When an outside air temperature becomes equal to or lower than a predetermined temperature, e.g., equal to or lower than $-30°$, a wind turbine of the wind turbine generator is stopped. In such a state, in a case where the stopped period of the wind turbine continues for several days, upon restarting the wind turbine generator next time, the wind turbine generator starts from a complete cold state in some cases.

In such a case, in order to again operate an oil system such as a blade pitch system, a gear box, and a main bearing, oil is heated by an electric heater so as to reach about $0°$ to $10°$.

However, even when oil is heated by the electric heater, heat of oil is radiated in a pipe or a cooler, so that a high heater capacity (e.g., several kW) is required to heat oil so as to reach about $0°$ to $10°$, causing a problem that the initial cost and the running cost are increased.

On the other hand, in a case where the cooler capacity is set smaller to reduce the capacity of the heater, there is a problem that radiation performance in the cooler is deteriorated. Especially, in an extreme case in the summer season, the outside air temperature is increased to about $+40°$ in some cases. In such a case, there is a problem that cooling ability becomes insufficient.

Generally, an opening for outside air introduced into the nacelle is not provided with an opening adjusting mechanism in many cases. In a case where a wind turbine generator having such an opening is disposed in a cold region where the outside air temperature is reduced to $-40°$ in the cold winter season, even when a fan of each cooler is stopped, natural draft passes, so that the atmospheric temperature in the nacelle is reduced to about the outside air temperature. Thus, a high heater capacity (e.g., several kW) is required for an oil heater, and there is a problem that the initial cost and the running cost are increased.

In addition, even in a wind turbine generator disposed in a relatively warm-weather region where the outside air temperature does not decrease to $-40°$ in the cold winter season, when the outside air temperature is $0°$ or lower and humidity is high, there is a problem that a louver provided in an air supply and exhaust opening is covered with ice and clogged up. When the louver is clogged up, venting performance to a cooler is deteriorated and the atmospheric temperature in the nacelle is increased, causing a problem that cooling ability of the cooler becomes insufficient. When the cooling ability of the cooler becomes insufficient in this manner, there is a problem that the temperature of a device in the nacelle cannot be controlled within a set range.

The present invention has been accomplished to solve the above problems, and it is an object of the present invention to provide a wind turbine generator capable of enhancing starting performance thereof in a cold region, as well as capable of securing temperature control ability for a device in a nacelle even in a case where high and low temperatures of the outside air are extremely different from each other.

Solution to Problem

To achieve the above object, the present invention provides the following solutions.

According to an aspect of the present invention, a wind turbine generator includes a nacelle for accommodating a generator set that generates electricity by rotation of a rotor having a plurality of blades; a ventilation opening provided in a wall surface located on a wind upstream side when the nacelle is normally operated; and a heat exchanging unit disposed in the ventilation opening to exchange heat between outside air and a lubricant of the generator set.

According to this aspect, the wind turbine generator is controlled by a direction of wind such that the nacelle is directed upstream during operation. Therefore, a ventilation opening functioning as an air-supply opening through which the outside air is introduced into the nacelle is provided in the front surface of the nacelle, i.e., in the wind upstream wall surface. With this structure, when the outside air is induced into the nacelle, the wind pressure (a draft) can be utilized. As the heat exchanging unit is disposed in the ventilation opening, the outside air passing through the heat exchanging unit is increased and heat exchanging performance is enhanced.

Further, ice adhering to the heat exchanging unit is melted by heat of a lubricant, that is, a fluid such as a lubricant oil or cooling water, flowing into the heat exchanging unit. Therefore, it is possible to prevent the ventilation opening from being closed by freezing.

In the above aspect, preferably, a louver is provided in a ventilation path the ventilation opening and outside the heat exchanging unit, and the louver and the heat exchanging unit are thermally connected to each other.

According to the above structure, by thermally connecting the heat exchanging unit and the louver with each other, heat of the lubricant oil flowing into the heat exchanging unit is transmitted to the louver. Even in a case where the outside air temperature is low, ice is prevented from adhering to the louver. Thus, it is possible to prevent the ventilation opening from being closed.

In the above aspect, preferably, an opening adjusting unit for adjusting an area of a flow path of the ventilation opening is provided in the ventilation opening.

According to this structure, when the wind turbine generator is disposed in a cold region where the outside air temperature is lowered to −40° in the cold winter season, the outside air is prevented from flowing into the nacelle by closing the ventilation opening with use of the opening adjusting unit. As a result, decreased is loss of heat provided from the heater to a lubricant, that is, a fluid such as a lubricant oil or cooling water. Therefore, it is possible to reduce the initial cost and the running cost.

In the above aspect, preferably, the opening adjusting unit is provided with a plurality of shielding plates for turning around a rotation axis that extends substantially horizontally.

According to the above structure, in a case where the outside air is not induced from the ventilation opening into the nacelle, the shielding plates hang down by the gravity and the ventilation opening is thus closed. In a case where the outside air is induced from the ventilation opening into the nacelle on the other hand, the shielding plates open by the flow of the induced outside air, and the ventilation opening is opened. By controlling opening and closing of the shielding plates by wind pressure in this manner, it is unnecessary to add a device for opening and closing the shielding plates. Moreover, since the heater capacity for the lubricant oil or cooling water can be reduced, the cost can be reduced.

In the above structure, preferably, the opening adjusting unit is provided with a drive unit for controlling turning angles of the plurality of shielding plates.

According to the above structure, since opening and closing of the ventilation opening are forcibly controlled by the drive unit, the ventilation opening is prevented from being unintentionally opened or closed by wind blowing into the ventilation opening, and reliability of temperature control of a device in the nacelle can be enhanced.

In the above aspect, preferably, a fan for inducing an outside air into the nacelle through the ventilation opening is provided downstream of the heat exchanging unit.

According to the above structure, since the outside air is induced into the nacelle by the fan, the outside air passing through the heat exchanging unit is increased, and the heat exchanging performance is therefore enhanced.

Advantageous Effects of Invention

According to the wind turbine generator of the present invention, the wall surface of the nacelle on the wind upstream side is provided with the ventilation opening and the heat exchanging unit is disposed in the ventilation opening, so that wind pressure (a draft) can be utilized. Therefore, there is an effect that heat exchanging performance in the heat exchanging unit (a cooler or the like) with a lubricant such as a lubricant oil or cooling water can be enhanced.

The ventilation opening is provided with the louver, and the louver and the heat exchanging unit are thermally connected to each other. With this structure, ice closing the heat exchanging unit is melted by heat of the lubricant oil. Therefore, there is an effect to suppress deterioration in performance of the heat exchanging unit due to freezing, and reliability of temperature control of a device in the nacelle can be enhanced.

In addition, the shielding plates opened and closed by wind pressure are disposed in the louver, so that the cold outside air is prevented from flowing into the nacelle. With this structure, there is an effect that the capacity of a heater for heating the lubricant oil or cooling water can be reduced and the cost thereof can be reduced. On the other hand, when opening and closing by the shielding plates are forcibly controlled, it is possible to prevent the shielding plates from being unintentionally opened or closed due to wind flowing thereinto. Therefore, there is an effect that reliability of temperature control of a device in the nacelle is improved.

DESCRIPTION OF EMBODIMENTS

First Embodiment

A wind turbine generator according to a first embodiment of the present invention will be explained with reference to FIGS. 1 to 4. FIGS. 1 to 4 show a case where an opening for allowing air to be sent therethrough from inside and outside of the nacelle is formed in a front surface of the nacelle so as to be used as an air-supply opening.

Figure 1:
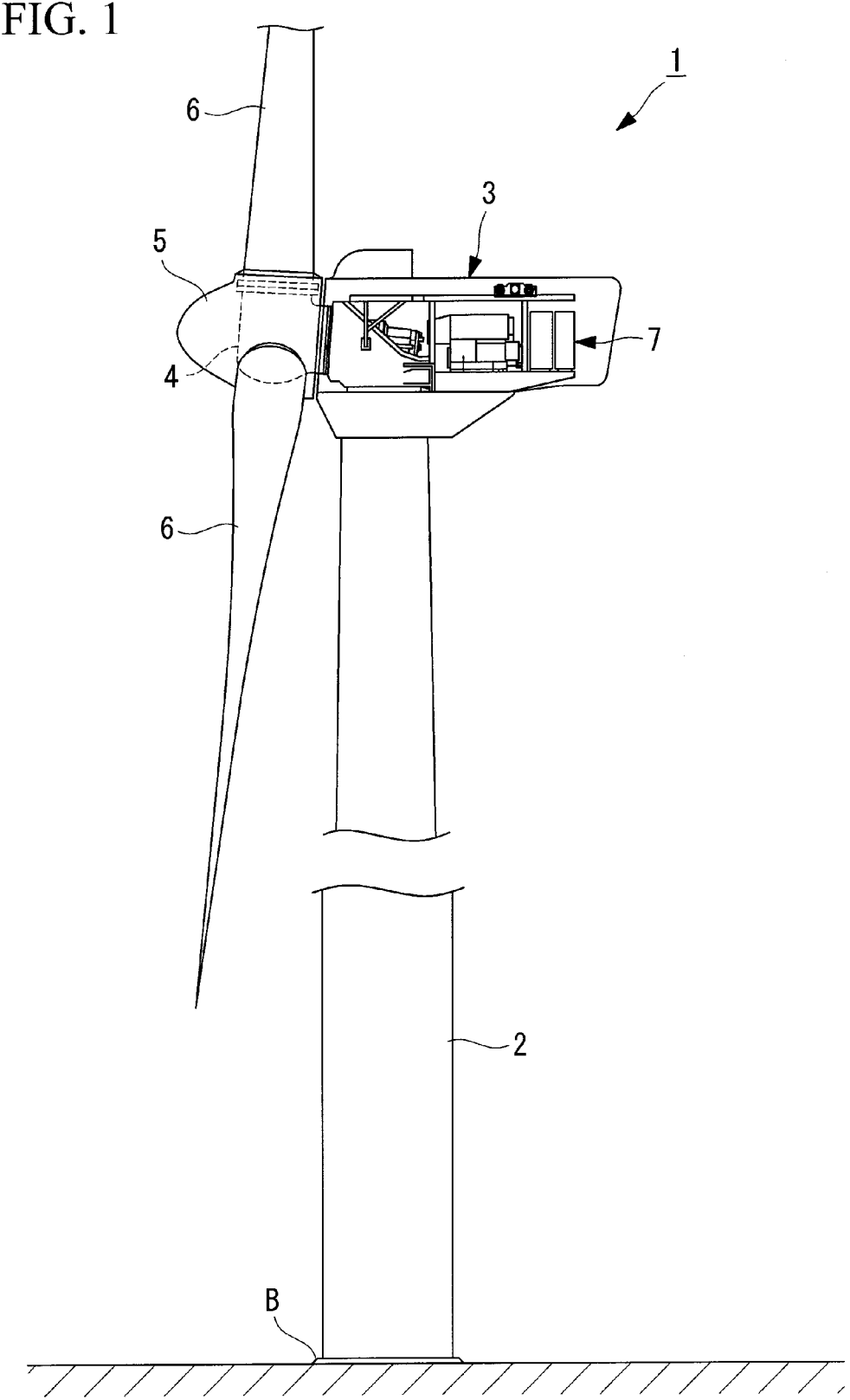
FIG. 1 is a general view for explaining a structure of a wind turbine generator according to a first embodiment of the present invention.

FIG. 1 is a general view for explaining a structure of the wind turbine generator according to the first embodiment.

A wind turbine generator 1 produces electricity using wind power.

As shown in FIG. 1, the wind turbine generator 1 includes a column (a tower) 2 standing on a base B, a nacelle 3 provided on an upper end of the column 2, a rotor head (a rotor) 4 provided on the nacelle 3 such that the rotor head 4 can rotate around a substantially horizontal axis, a head capsule 5 covering the rotor head 4, a plurality of wind turbine rotor blades (blades) 6 radially mounted around a rotation axis of the rotor head 4, and a device in the nacelle (a generator set) 7 which generates electricity by rotating the rotor head 4.

Although three wind turbine rotor blades 6 are provided in this embodiment, the number of the wind turbine rotor blades 6 is not limited to three, but the number may be two, four or more with no particular limitation to the number of the wind turbine rotor blades.

As shown in FIG. 1, the column 2 extends upward from the base B (upward in FIG. 1), and a plurality of units is connected in the vertical direction or the like. The uppermost portion of the column 2 is provided with the nacelle 3. When the column 2 includes the plurality of units, the nacelle 3 is disposed on the uppermost unit.

Figure 2:
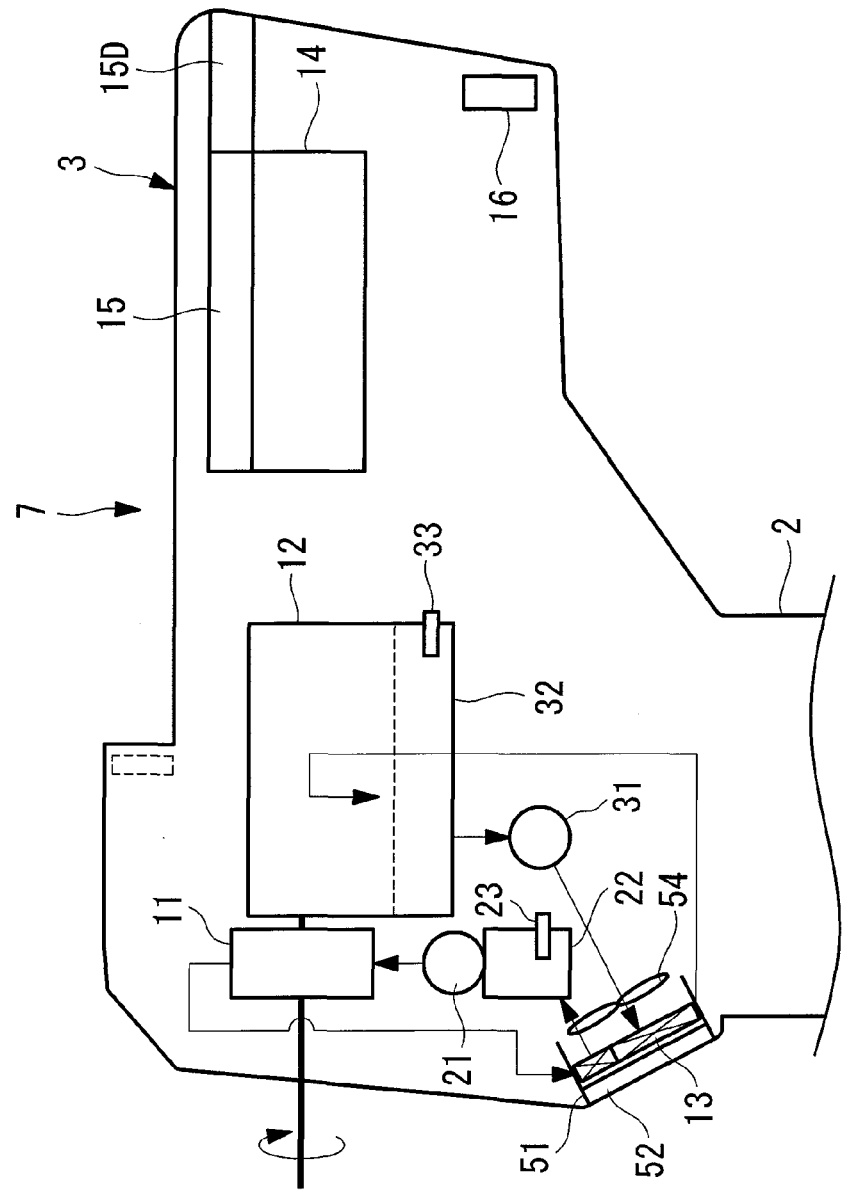
FIG. 2 is a schematic diagram for explaining a structure in a nacelle shown in FIG. 1.

FIG. 2 is a schematic diagram for explaining a structure in the nacelle shown in FIG. 1.

As shown in FIGS. 1 and 2, the nacelle 3 rotatably supports the rotor head 4. A device 7 in the nacelle which generates electricity by rotation of the rotor head 4 is accommodated in the nacelle 3.

An opening (a ventilation opening) 51 is formed in a lower portion of a front surface of the nacelle 3 on the side of the rotor head 4 as shown in FIG. 2.

Figure 3:
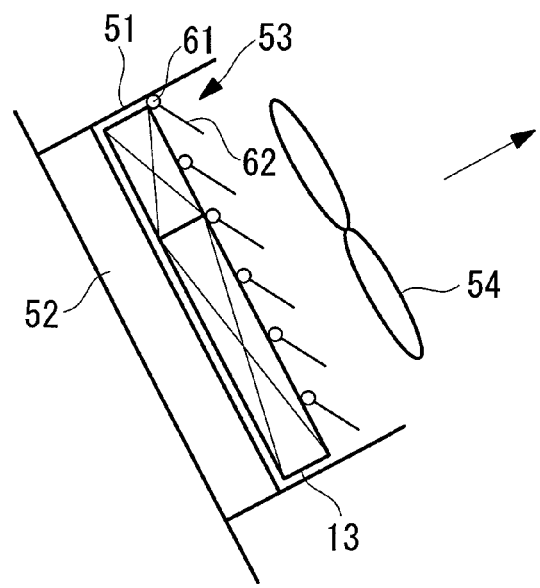
FIG. 3 is a schematic diagram for explaining a structure near an opening shown in FIG. 2.

FIG. 3 is a schematic diagram for explaining a structure near a ventilation path shown in FIG. 2.

The opening 51 is a path through which the outside air is introduced from outside of the nacelle 3 into the nacelle 3. The opening 51 includes a louver 52, a later-described heat exchanging unit 13, an opening adjusting unit 53, and a fan 54, in this order from the outer side toward the inner side of the nacelle 3.

Figure 4:
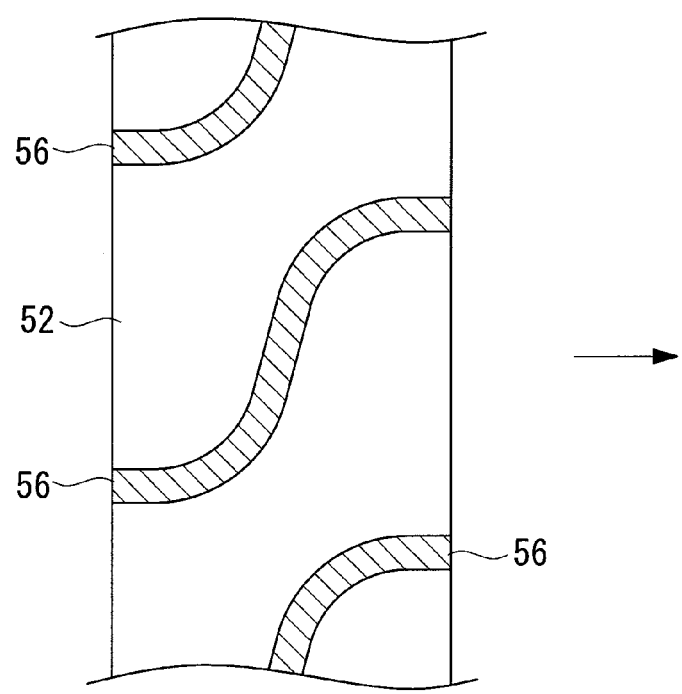
FIG. 4 is a sectional perspective view for explaining a structure of a louver shown in FIG. 3.

FIG. 4 is a sectional perspective view for explaining a structure of the louver shown in FIG. 3.

The louver 52 is disposed on the outermost side of the nacelle 3 in the opening 51. The louver 52 prevents rain from entering the opening 51.

The louver 52 is thermally connected to the heat exchanging unit 13 by means of a metal stay.

As shown in FIG. 4, in the louver 52, crossbeam members 56 are arranged toward the outer side of the nacelle 3 (the left side in FIG. 4) toward the inner side of the nacelle 3 (the right side in FIG. 4). Each of the crossbeam members 56 has a slant surface inclining upward (upward in FIG. 4).

With this structure, the crossbeam members 56 prevent rain and snow from entering the opening 51.

As shown in FIG. 3, the opening adjusting unit 53 is disposed near the heat exchanging unit 13.

The opening adjusting unit 53 is provided with a plurality of rotation shafts 61 extending substantially horizontally (perpendicularly to the paper sheet of FIG. 3), and shielding plates 62 extending from the rotation shafts 61 and being turned by gravity or the flow of the outside air flowing through the ventilation path 51.

Preferable materials for the opening adjusting unit 53 are high-temperature resistant materials such as stainless steel and aluminum.

The fan 54 is disposed in the opening 51. The fan 54 rotates to suck the outside air from outside the nacelle 3 into the nacelle 3.

As shown in FIG. 1, a plurality of wind turbine rotor blades 6 extending radially around the rotation axis is mounted on the rotor head 4, and the periphery of the wind turbine rotor blades 6 is covered with the head capsule 5.

The rotor head 4 is provided with a pitch control unit (not shown) which rotates the wind turbine rotor blades 6 around the axes thereof to change the pitch angles of the wind turbine rotor blades 6.

With this structure, when a wind hits the wind turbine rotor blade 6 from the rotation axial direction of the rotor head 4, a force for rotating the rotor head 4 around the rotation axis thereof is generated in the wind turbine rotor blade 6, and the rotor head 4 is rotated and driven.

As shown in FIG. 2, the device 7 in the nacelle accommodated in the nacelle 3 includes the main bearing 11 for rotatably supporting the main shaft (not shown) that transmits a rotation driving force of the rotor head 4 to the generator 14, the gear box 12 for accelerating the rotation of the rotor head 4 and transmitting the rotation to the generator 14, the heat exchanging unit 13 for cooling oil used for lubricating the main bearing 11 and the gear box 12, the generator 14 for generating electricity using the transmitted rotation driving force, the generator heat exchanging unit 15 for cooling the generator 14, and the inverter heat exchanging unit 16 for cooling the inverter that controls voltage and a frequency of the generated electricity.

The main bearing 11 is provided with a main bearing tank 22 and a main bearing pump 21 which pumps lubricant oil (lubricant). The lubricant oil lubricates inside the main bearing 11. The bearing pump 21 and the main bearing tank 22 constitute a circulation path for the lubricant oil together with the main bearing 11 and the heat exchanging unit 13.

The main bearing tank 22 is provided with a main bearing heater 23 which heats main lubricant oil stored in the main bearing tank 22.

The gear box 12 transmits, to the generator 14, a rotation driving force transmitted from the rotor head 4.

The gear box 12 is provided with a gear box tank 32 and a gear box pump 31 which pumps lubricant oil. The lubricant oil lubricates inside the gear box 12. The gear box pump 31 and the gear box tank 32 constitute a circulation path for the lubricant oil together with the gear box 12 and the heat exchanging unit 13.

The gear box tank 32 is provided with a gear box heater 33 which heats lubricant oil stored in the gear box tank 32.

The generator heat exchanging unit 15 is a heat exchanger disposed adjacent to the generator 14, and radiates heat generated by the generator 14 to the air in the nacelle 3.

The generator heat exchanging unit 15 is connected to a generator duct 15D extending rearward of the nacelle 3. The air of which heat is absorbed in the generator heat exchanging unit 15 is discharged rearward of the nacelle 3 through the generator duct 15D.

The inverter heat exchanging unit 16 is a heat exchanger disposed behind the nacelle 3, and radiates heat generated by the inverter to the air in the nacelle 3. The inverter heat exchanging unit 16 discharges the air, of which heat is absorbed, rearward of the nacelle 3.

An outline of an electricity generating method with use of the wind turbine generator 1 having the above-described structure will be explained.

In the wind turbine generator 1, wind power energy which hits the wind turbine rotor blade 6 from the rotation axial direction of the rotor head 4 is converted into power for rotating the rotor head 4 around the rotation axis.

Rotation of the rotor head 4 is transmitted to the device 7 in the nacelle. In the device 7 in the nacelle, there is generated electricity, e.g., AC electricity having a frequency of 50 Hz or 60 Hz suitable for a target to supply electricity.

At least while electricity is generated, in order to effectively apply wind power energy to the wind turbine rotor blade, the nacelle 3 is appropriately rotated on a horizontal plane, thereby orienting the rotor head 4 to an upstream direction of wind.

Next, as the feature of the present embodiment, there will be explained heat radiation in the heat exchanging unit 13 and the like.

When the fan 54 rotates, the outside air outside the nacelle 3 is induced, the opening adjusting unit 53 opens, and the outside air is introduced into the nacelle 3 as shown in FIGS. 2 and 3. More specifically, the shielding plates 62 of the opening adjusting unit 53 turn around the rotation shafts 61 toward the fan 54, and a flow path of the outside air is formed.

When electricity is being generated by the wind turbine generator 1, since the opening 51 is provided in the front wall surface of the nacelle on the side of the rotor head 4 in the nacelle 3, wind is blown into the opening 51 directly. A flow rate of the outside air flowing into the opening 51 is thus greater than a flow rate of the air sucked by the fan motor.

The outside air flows between the crossbeam members 56 of the louver 52, and flows into the heat exchanging unit 13. In the heat exchanging unit 13, the outside air absorbs heat from lubricant oil which lubricated the main bearing 11 and the gear box 12 and of which temperature became high.

The outside air which absorbed heat and of which temperature was increased passes through the opening adjusting unit 53 and flows into the nacelle 3.

The lubricant oil for the main bearing of which heat was removed and which was cooled circulates through the main bearing tank 22, the main bearing pump 21, and the main bearing 11 in this order, and again flows into the heat exchanging unit 13. The lubricant oil for the gear box circulates the gear box 12, the gear box tank 32, and the gear box pump 31 in this order, and again flows into the heat exchanging unit 13.

Heat of the lubricant oil is transmitted from the heat exchanging unit 13 to the louver 52, and the heat prevents ice from adhering to the louver 52. That is, even in a case where the outside air has high humidity and the temperature thereof is reduced to 0° or lower, the temperature of the louver 52 is maintained at a value allowing adhering ice to be melted (e.g., 3° to 5° or higher).

When the fan 54 is stopped, i.e., when the electricity generating operation by the wind turbine generator 1 is stopped, the wind pressure in the opening 51 is eliminated, so that the opening adjusting unit 53 closes the opening 51. That is, the shielding plates 62 of the opening adjusting unit 53 hang down by the gravity, and each of the shielding plates 62 closes the opening 51 together with the adjacent shielding plates 62.

With this structure, it is possible to prevent the outside air outside the nacelle 3 from flowing into the nacelle 3 through the opening 51.

According to this structure, the opening 51 opens on the side of the rotor head 4 in the nacelle 3, i.e., opens in a front wall surface of the nacelle on upstream of wind, the wind pressure can be utilized for inducement of the outside air into the nacelle 3. Thus, the flow rate of the outside air passing through the heat exchanging unit 13 is increased, and heat exchanging performance is enhanced.

Since the louver 52 and the heat exchanging unit 13 are thermally connected to each other, heat of the lubricant oil flowing into the heat exchanging unit 13 is transmitted to the louver 52. Therefore, even in a case where the humidity of the outside air is high and the temperature thereof is reduced to 0° or lower, and even when ice adheres to the louver 52, such ice can be melted. Thus, the opening 51 is prevented from being closed. Therefore, reliability of temperature control of the device 7 in the nacelle can be enhanced.

When the outside air is cold, the opening 51 can be closed with use of the opening adjusting unit 53, so that it is possible to prevent the cold outside air from flowing into the nacelle 3. Thus, when the outside air is cold and the wind turbine generator 1 is started from a cold state, it becomes easy to increase the temperature of the lubricant oil and the like, and time required for starting the wind turbine generator 1 is shortened.

The invention of the present application is not limited to an invention in which the opening 51 is provided with the opening adjusting unit 53 as in the above-described embodiment.

The invention of the present application does not limit a fluid having heat exchanged by the heat exchanging unit 13 to lubricant oil, but heat of another fluid such as cooling water may be exchanged by the heat exchanging unit 13.

Although the heat exchanging unit 13 and the louver 52 are combined in the opening 51 in the present embodiment as shown in FIGS. 2 and 3, the opening 51 is not limited to the air-supply opening in the present invention, and the opening 51 may be used as a discharge opening.

In this case, an effect of performance enhancement of the heat exchanging unit 13 by the wind pressure becomes small, but ice adhering to the heat exchanging unit 13 is melted by sensible heat of lubricant oil or cooling water, so that an effect for enhancing reliability of temperature control of a device in the nacelle in a cold region is maintained.

Second Embodiment

Figure 5:
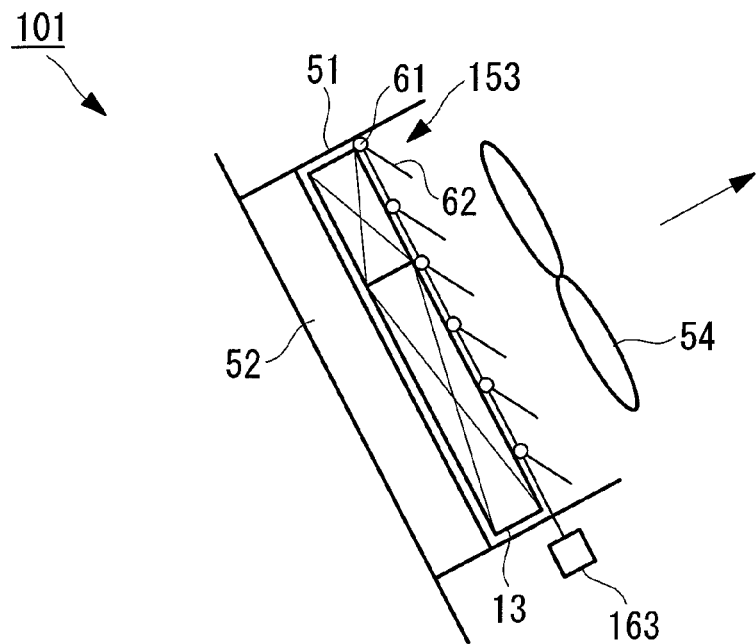
FIG. 5 is a schematic diagram for explaining a structure of an opening adjusting unit of a wind turbine generator according to a second embodiment of the present invention.

Next, a second embodiment of the present invention will be explained with reference to FIG. 5. FIG. 5 shows a case where an opening for allowing air to be sent from inside and outside of the nacelle is formed in a front surface of the nacelle, and the opening is used as an air-supply opening.

The basic structure of the wind turbine generator of the present embodiment is the same as that of the first embodiment, but the structure of the opening adjusting unit is different from that of the first embodiment. Thus, in the present embodiment, only the structure of the opening adjusting unit will be explained with reference to FIG. 5, and explanation of other structures will not be repeated.

FIG. 5 is a schematic diagram for explaining the structure of the opening adjusting unit of the wind turbine generator according to the present embodiment.

The same constituent elements as those of the first embodiment are designated with the same symbols, and explanation thereof will not be repeated.

As shown in FIG. 5, a ventilation path 51 of a wind turbine generator 101 includes a louver 52, a heat exchanging unit 13, an opening adjusting unit 153, and a fan 54, in this order from the outer side to the inner side of the nacelle 3.

The opening adjusting unit 153 is disposed between the heat exchanging unit 13 and the fan 54.

The opening adjusting unit 153 is provided with rotation shafts 61 extending substantially horizontally (perpendicularly to the paper sheet of FIG. 5), and shielding plates 62 extending from the rotation shafts 61 so as to turn, and a motor (a drive unit) 163 which controls turning angles of the shielding plates 62.

The motor 163 controls the turning angle of the shielding plate 62 in accordance with an operating state of the wind turbine generator 101, and controls a cross-sectional area of a flow path through which the outside air flows in the opening 51.

For example, when the amount of generated electricity in the wind turbine generator 101 is increased and the generated heat value in the gear box 12 and the main bearing 11 is increased, the shielding plates 62 are rotated by the motor 163 in association with start of the fan 54, so as to increase the flow rate of the outside air passing through the heat exchanging unit 13.

When electricity generation by the wind turbine generator 101 is stopped, the shielding plates 62 are lowered by the motor 163 to close the opening 51.

According to this structure, since the opening and closing operation of the opening 51 is forcibly controlled by the motor 163, it is possible to prevent the unintentional opening and closing motion of the opening 51 caused by the outside air blown into the opening 51, and reliability of the temperature control of a device in the nacelle can be enhanced.

The invention of the present application does not limit a fluid having heat exchanged by the heat exchanging unit 13 to lubricant oil, but heat of another fluid such as cooling water may be exchanged by the heat exchanging unit 13.

Although the heat exchanging unit 13 and the louver 52 are combined in the opening 51 in the present embodiment as shown in FIG. 5, the opening 51 is not limited to the air-supply opening in the present invention, and the opening 51 may be used as a discharge opening.

In this case, an effect of performance enhancement of the heat exchanging unit 13 by the wind pressure becomes small, but ice adhering to the heat exchanging unit 13 is melted by sensible heat of lubricant oil or cooling water, so that an effect for enhancing reliability of temperature control of a device in the nacelle in a cold region is maintained.

Third Embodiment

Figure 6:
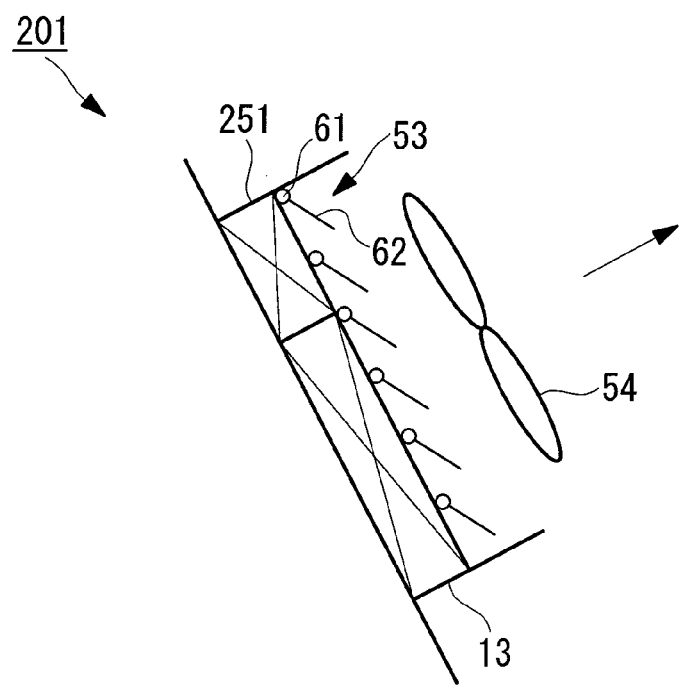
FIG. 6 is a schematic diagram for explaining a structure near a wind path of a wind turbine generator according to a third embodiment of the present invention.

Next, a third embodiment of the present invention will be explained with reference to FIG. 6. FIG. 6 shows a case where an opening for allowing air to be sent from inside and outside of the nacelle is formed in a front surface of the nacelle, and the opening is used as an air-supply opening.

The basic structure of the wind turbine generator of the present embodiment is the same as that of the first embodiment, but the structure near the opening is different from that of the first embodiment. Thus, in the present embodiment, only the structure near the opening will be explained with reference to FIG. 6, and explanation of other structures will not be repeated.

FIG. 6 is a schematic diagram for explaining the structure near a wind path of the wind turbine generator according to the present embodiment.

The same constituent elements as those of the first embodiment are designated with the same symbols, and explanation thereof will not be repeated.

As shown in FIG. 6, an opening (a ventilation opening) 251 of a wind turbine generator 201 includes a heat exchanging unit 13, an opening adjusting unit 53, and a fan 54, in this order from the outer side to the inner side of the nacelle 3.

The heat exchanging unit 13 is a heat exchanger disposed on the outermost side of the nacelle 3 in the opening 251 to radiate heat of lubricant oil. The heat exchanging unit 13 also functions as a louver.

According to the above structure, since the heat exchanging unit 13 functions as the louver, heat of the lubricant oil can be transmitted to ice with smaller thermal resistance. Thus, even in a case where ice adheres to the heat exchanging unit 13, such ice can be melted by the heat of the lubricant oil flowing into the heat exchanging unit 13, and it is possible to more effectively prevent the opening 251 from being closed due to freezing.

The invention of the present application does not limit a fluid having heat exchanged by the heat exchanging unit 13 to lubricant oil, but heat of another fluid such as cooling water may be exchanged by the heat exchanging unit 13.

Although the heat exchanging unit 13 also functioning as the louver is provided in the opening 251 in the present embodiment as shown in FIG. 6, the opening 251 is not limited to the air-supply opening in the present invention, and the opening 251 may be used as a discharge opening.

In this case, an effect of performance enhancement of the heat exchanging unit 13 by the wind pressure becomes small, but ice adhering to the heat exchanging unit 13 is melted by sensible heat of lubricant oil or cooling water, so that an effect for enhancing reliability of temperature control of a device in the nacelle in a cold region is maintained.

REFERENCE SIGNS LIST 1, 101, 201: Wind turbine generator
3: Nacelle
4: Rotor head (Rotor)
6: Wind turbine rotor blade (Blade)
7: Device in nacelle (Generator set)
13: Heat exchanging unit
51, 251: Opening
52: Louver
53: Opening adjusting unit
54: Fan
163: Motor (Drive unit)

The invention claimed is:

1. A wind turbine generator comprising a nacelle for accommodating a generator set that generates electricity by rotation of a rotor having a plurality of blades;
   a ventilation opening provided in a wall surface located on a wind upstream side when the nacelle is normally operated; and
   a heat exchanging unit disposed in the ventilation opening to exchange heat between an outside air and a lubricant of the generator set.

2. A wind turbine generator according to claim 1, wherein a louver is provided in the ventilation opening and outside the heat exchanging unit, and
   the louver and the heat exchanging unit are thermally connected to each other.

3. A wind turbine generator according to claim 1, wherein an opening adjusting unit for adjusting an area of a flow path of the ventilation opening is provided in the ventilation opening.

4. A wind turbine generator according to claim 1, wherein the opening adjusting unit is provided with a plurality of shielding plates for turning around a rotation axis that extends substantially horizontally.

5. A wind turbine generator according to claim 4, wherein the opening adjusting unit is provided with a drive unit for controlling turning angles of the plurality of shielding plates.

6. A wind turbine generator according to claim 1, wherein a fan for inducing an outside air into the nacelle through the ventilation opening is provided downstream of the heat exchanging unit.

* * * * *